United States Patent [19]
Nishikawa

[11] Patent Number: 6,021,951
[45] Date of Patent: Feb. 8, 2000

[54] WIRELESS IC CARD AND IC CARD READER COMMUNICATION SYSTEM

[75] Inventor: Hisashi Nishikawa, Shiga-ken, Japan

[73] Assignee: International Business Machines Corporation, Armonk, N.Y.

[21] Appl. No.: 09/060,674

[22] Filed: Apr. 15, 1998

[30] Foreign Application Priority Data

Oct. 7, 1997 [JP] Japan .................................. 9-274762

[51] Int. Cl.⁷ .................................................. G06K 19/06
[52] U.S. Cl. ...................... 235/494; 235/492; 340/825.54
[58] Field of Search ..................................... 235/494, 492, 235/449; 340/825.53, 825.54, 825.69, 825.72

[56] References Cited

U.S. PATENT DOCUMENTS

| | | | |
|---|---|---|---|
| 4,797,541 | 1/1989 | Billings et al. ........................... | 235/449 |
| 4,814,595 | 3/1989 | Gilboa ...................................... | 235/492 |
| 4,845,347 | 7/1989 | McCrindle et al. ..................... | 235/492 |
| 5,241,160 | 8/1993 | Bashan et al. ........................... | 235/492 |
| 5,326,965 | 7/1994 | Inoue ....................................... | 235/492 |
| 5,349,173 | 9/1994 | Scheckel et al. ........................ | 235/492 |
| 5,418,358 | 5/1995 | Bruhnke et al. ......................... | 235/492 |
| 5,914,980 | 6/1999 | Yokota et al. ........................... | 375/200 |

*Primary Examiner*—Michael G Lee
*Assistant Examiner*—Daniel St. Cyr
*Attorney, Agent, or Firm*—Robert P. Tassinari

[57] ABSTRACT

In the present wireless card system of the present invention, when data is transmitted from an IC card to a card reader, the IC card changes the load imposed on the transmission system in accordance with the contents of the data, and the card reader detects a reflected wave, which is generated in accordance with a change in the load, and identifies the data. The reflected wave is not a wave emitted by the IC card into the atmosphere, but is an alternating current that relies on the load condition in the transmission system between the transmitter and the receiver, and that is returned from the load in the transmission system. Thus, the reflected wave is not easily affected by the noise field in the vicinity of the antenna, and more precise data transmission is possible.

25 Claims, 2 Drawing Sheets

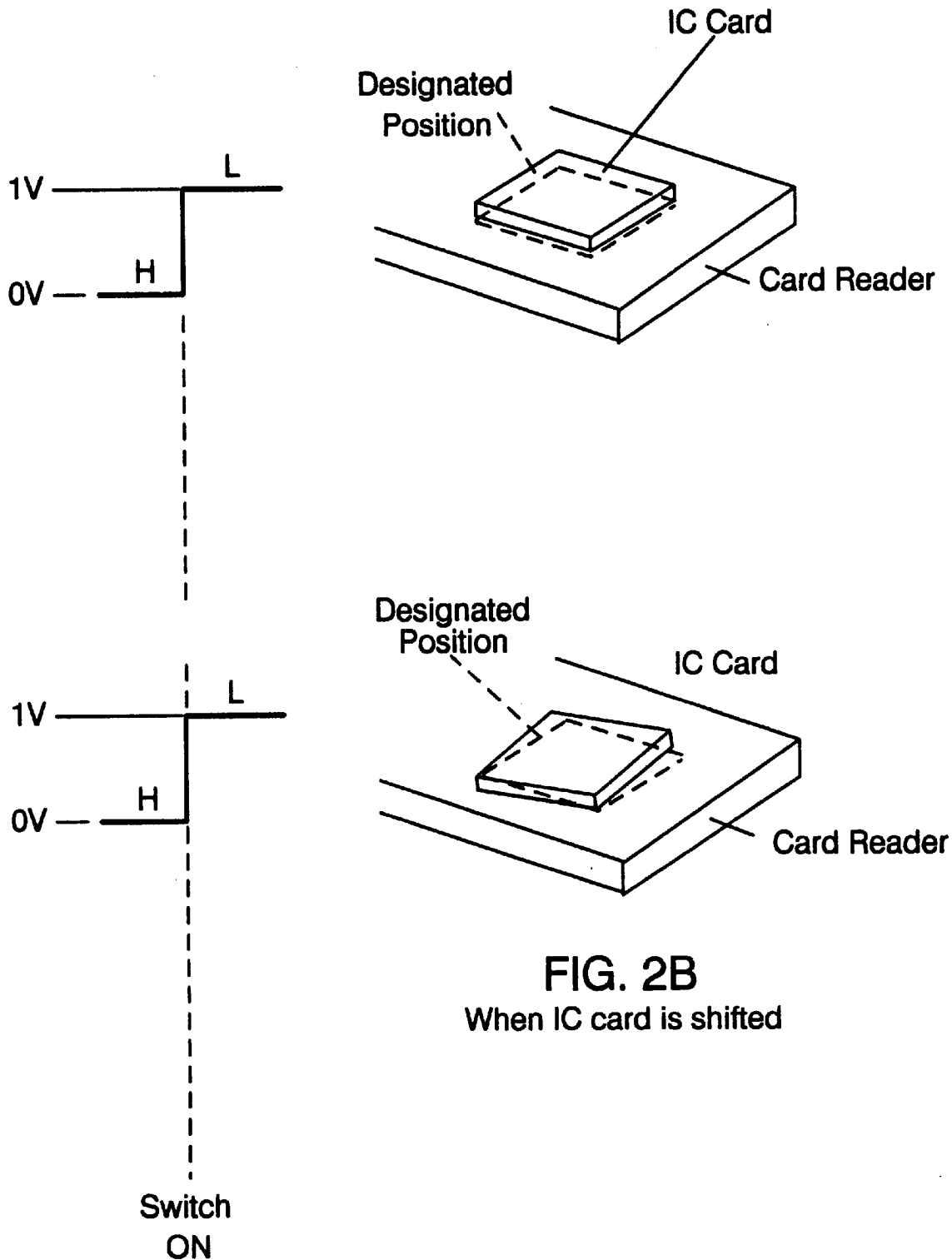

WIRELESS IC CARD AND IC CARD READER COMMUNICATION SYSTEM

FIELD OF THE INVENTION

The present invention relates to a wireless (IC card) system for employing a card reader to read data stored on an IC card, such as a cash card, a credit card, an ID (identification) card or a memory card, in which a microcomputer and a memory are mounted.

BACKGROUND OF THE PRESENT INVENTION

A wireless IC card system has been proposed that employs a card reader to read data stored on an IC card (such as a cash card, a credit card, an ID (identification) card or a memory card) in which a microcomputer and a memory are mounted. In such systems, the exchange of data is not performed in the same manner as it is in a wired IC card system where metal terminals on a card are electrically connected directly to an external input/output device. Instead, antennas are used to exchange data in the form of vibrational energy generated by a high frequency electromagnetic field or by ultrasonic waves. Therefore, the wireless IC card system does not have the problems that are inherent to the wired IC card system, such as contact failures occasioned by the abrasion or the corrosion of metal terminals, or the accumulation of dust and dirt on the terminals, and the electrostatic damage of card components.

Japanese Unexamined Patent Publication No. Hei 2-19989 discloses a system that provides for the mounting on a card of a dipole antenna resonant at a specific frequency, and for an impedance at the antenna to be varied in accordance with the contents of the data to be transmitted to a card reader. Specifically, the resonance of the dipole antenna is employed as a reflector, and, separately from a transmission antenna on the card reader, a reception antenna is provided by which waves reflected into the atmosphere are received. The reflective property of the dipole antenna of the IC card changes in accordance with a change in the impedance at the antenna. When the transmission antenna of the card reader emits an electromagnetic wave having a specific frequency, the phase or the level of a reflected wave is changed according to the contents of the transmitted data. This change is detected by the reception antenna of the card reader, so that the transmitted data can be specifically identified.

However, in the conventional system described in the above publication a reflected wave emitted into the atmosphere is received by the card reader and the transmitted data is identified. As a result, the conventional system is easily affected by a noise field that occurs in the vicinity of an antenna. Furthermore, two special antennas, a transmission antenna and a reception antenna, must be provided for the card reader, both of which must be highly directional in order to prevent a signal transmitted by the transmission antenna from doubling around and going directly to the reception antenna.

In addition, as is described in the embodiment in the above publication, while the conventional system is adequate for use in the GHz band, its use is difficult at low frequencies in an HF (high frequency) band, such as 14 Mhz, which is actually used for an IC card. To employ the conventional system in the HF band, a dipole antenna having a calculated length of 10 m is required, and it is impossible to mount such an antenna on a compact IC card.

Therefore, one object of the present invention to provide a wireless IC card system that is little affected by a peripheral noise field.

SUMMARY OF THE INVENTION

According to the wireless card system of the present invention, when data is transmitted from an IC card to a card reader, the IC card changes the load imposed on the transmission system in accordance with the contents of the data, and the card reader detects a reflected wave, which is generated in accordance with a change in the load, and identifies the data. The reflected wave is not a wave emitted by the IC card into the atmosphere, but is an alternating current that relies on the load condition in the transmission system between the transmitter and the receiver, and that is returned from the load in the transmission system. Thus, the reflected wave is not easily affected by the noise field in the vicinity of the antenna, and more precise data transmission is possible.

According to one aspect of the present invention, a wireless IC card system, an IC card employing an antenna for transmitting data to an antenna of a card reader, comprises: oscillation means, provided for the card reader, for generating an alternating-current signal as a carrier; switching means, connected to the antenna of the IC card; control means, provided for the IC card, for controlling the switching means in accordance with the contents of data to be transmitted to the IC card reader, so that an alternating-current property of the IC card is changed, and for selectively changing to a first state or to a second state a load imposed on a transmission system between the IC card and the card reader; reflected wave detection means, provided for the card reader, for detecting a reflected wave that occurs in the transmission system in accordance with the load; and data identification means, provided for the card reader, for employing a detected reflected wave to identify the data to be transmitted.

In this arrangement, matching means having a coil and a capacitor may be further provided between the reflected wave detection means of the card reader and the antenna of the card reader. The matching means initially sets the first state where matching the load of the transmission system is provided when the alternating-current signal is supplied.

The reflected wave detection means may include directional coupling means. The directional coupling means can detect an alternating direction in the transmission system. The filter has a coil and a capacitor and can eliminate high frequency elements of a carrier.

When output from the filter is greater than a threshold value, the data identification means determines that the data to be transmitted is data in one state, and when output from the filter is smaller than a threshold value, the data identification means determines that the data to be transmitted is data in the other state.

According to a second aspect of the present invention, an IC card reader, receiving data from an IC card through an antenna, comprises: oscillation means for generating an alternating-current signal as a carrier; reflected wave detection means for changing an alternating-current property of the IC card in accordance with the contents of data received from the IC card, and for selectively changing to a first state or to a second state a load imposed on a transmission system between the IC card and the card reader in order to detect a reflected wave occurring in the transmission system; and data identification means for identifying the received data in accordance with the detected reflected wave.

In this arrangement, matching means having a coil and a capacitor may be further provided between the reflected wave detection means and the antenna. The matching means initially establishes the first state wherein matching the load of the transmission system is acquired when the alternating-current signal is supplied.

The reflected wave detection means may include directional coupling means and the filter.

When output from the filter is greater than a threshold value, the data specification means determines the data to be transmitted is data in one state, and when output from the filter is smaller than a threshold value, the data specification means determines the data to be transmitted is data in the other state.

According to a third aspect of the present invention, an IC card comprises: a coil antenna; switching means, connected to the coil antenna, for selectively opening or short-circuiting the antenna; a memory in which data to be transmitted are stored; and control means controlling the switching means in accordance with the data stored in the memory for selectively changing an alternating-current property of the IC card so as to change a load condition on a transmission system between a transmitter and a receiver, and for generating a reflected wave according to the transmitted data in the transmission system, so that the receiver of the data can identify the data.

With this arrangement, rectification means may be further provided for converting the alternating-current signal that is received at the coil antenna in order to produce the power for driving the IC card. It is preferable that the switching means be driven by the driving power. It is also preferable that in general the memory be nonvolatile memory.

In the above described structure, the conditions of the loads imposed on a transmission system are changed in accordance with the contents of the data to be transmitted. The values of reflected waves, which are propagated in the transmission system between the transmitter and the receiver, also differ in accordance with changes in the load conditions. These reflected waves are not spatial reflected waves emitted at the antenna of the IC card, but constitute an alternating current that is returned from the load side (the IC card) in the transmission system in accordance with the load condition of the transmission system. As a result, these reflected waves are not basically affected by the noise field produced in the space. Since the values of the reflected waves in the transmission system correspond to the data to be transmitted, data to be transmitted by the IC card can be identified by monitoring this value.

BRIEF DESCRIPTION OF THE DRAWINGS

FIG. 2 is a diagram showing a relationship between the location of an IC card relative to a card reader, and pulse data.

DETAILED DESCRIPTION OF THE INVENTION

Figure 1:
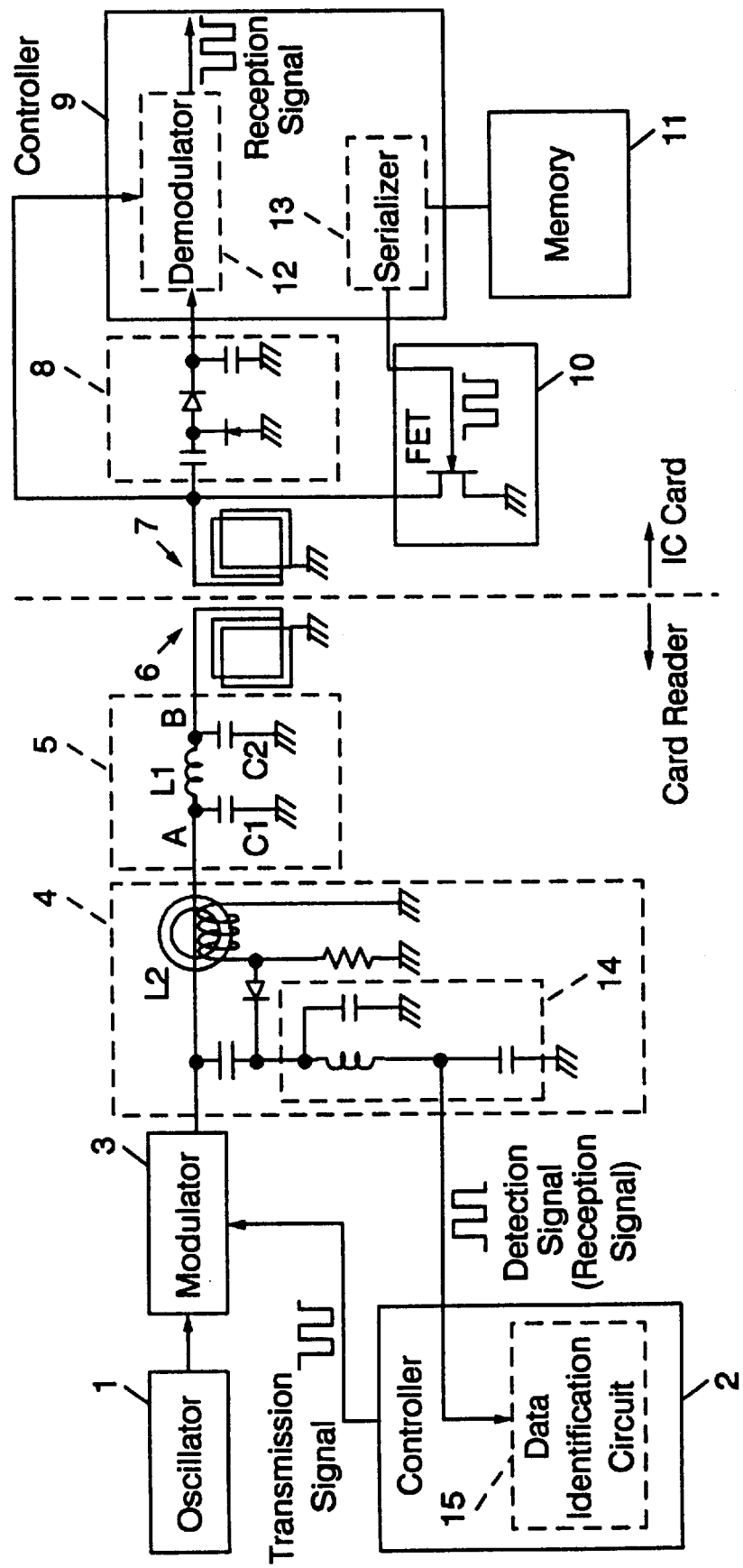
FIG. 1 is a block diagram illustrating the structure of a wireless IC card system according to one embodiment of the present invention.

FIG. 1 is a block diagram illustrating the arrangement of a wireless IC card system according to one embodiment of the present invention. The wireless IC card system is composed of a card reader and an IC card. The card reader comprises an oscillator 1, a controller 2, a modulator 3, a reflected wave detector 4, a matching circuit 5 and a coil antenna 6. The IC card comprises: a coil antenna 7, a rectifier 8, a controller 9, a switching circuit 10 and a memory 11.

The memory 11 is employed to store data for various purposes, such as for drawing money from a bank account, for providing personal identification data, and for designating the contents of a product and the delivery destination when the IC card is attached to the product.

First, data transmission from the card reader to the IC card will be described. The oscillator 1 generates an alternating-current signal as a carrier. The frequency of the alternating-current signal may, for example, be a low frequency in an HF band, such as 14 MHz, that is actually employed for the IC card. The present system can be easily accomplished using such a frequency band by employing a coil antenna.

The controller 2 under control of controller logic supplies to the modulator 3 digital data to be transmitted from the card reader to the IC card. The data to be transmitted are serialized and the serial data are superimposed on a carrier by the modulator 3, so that a modulated alternating-current signal can be acquired. One of several conventional modulation methods can be employed. The modulated alternating-current signal is emitted into space as a high frequency electromagnetic field from the coil antenna 6 of the card reader. The reflected wave detector 4 and the matching circuit 5 are not directly related to the transmission of data from the card reader to the IC card. These circuits are related to the reception of data transmitted from the IC card to the card reader, which will be described later.

The high frequency electromagnetic field is received by the coil antenna 7 of the IC card. An alternating-current signal corresponding to the electromagnetic field is transmitted to the rectifier 8 and the controller 9. The controller 9 saves the received data in the memory 11, and transmits the processing result under control of controller logic. The controller 9 includes a demodulator 12 which demodulates received data and a serializer 13 which converts parallel to serial data and vice versa. The alternating-current signal transmitted to the controller 9 is identified as digital data transmitted by the card reader. The digital data is stored in the memory 11, which is a nonvolatile memory (e.g., an EEPROM).

An alternating-current signal received at the antenna 7 of the IC card is converted by the rectifier 8 to produce a direct current signal. The direct current signal is employed as the current for operating the IC card. In this embodiment, a voltage doubler is employed as the rectifier 8. It is preferable that a voltage doubler be employed where, as a result of the design of the IC card, the coil antenna 7 of the IC card consists of only a few turns of wire. Because the received alternating-current signal is converted to produce a current, installation of a battery in the IC card is not required. If there is a battery mounted in the IC card, the power consumed by the battery is reduced.

The switching circuit 10 is an FET switch. In the ON state of the switch, the coil antenna 7 is short-circuited, and in the OFF state, the coil antenna 7 is opened. The switching circuit 10 is in the OFF state when a signal is received from the card reader.

Now, data transmission from the IC card to the card reader will be described. Data transmission performed by the present invention is not accomplished by a method that involves the emission of a reflected wave from the antenna of the IC card into the atmosphere, but instead employs a method whereby a load imposed on a transmission system between a transmitter and a receiver is changed in accordance with the content of the data to be transmitted. Initially, the load matches the characteristic impedance of the transmission system. Then, the alternating-current impedance of the IC card (a composite property consisting of a pure resistance R and complexes (capacitance C and inductance L)) is varied in accordance with the transmitted data and the load matching. As a result, the load on the transmission line is varied accordingly. The transmitted data is identified by the monitoring of a reflected wave in the transmission system that changes according to the load on the transmission system. The important components relative to these features are the reflected wave detector 4 and the matching means 5 of the card reader, and the switching circuit 10 of the IC card.

An explanation will now be given for the relationship existing between the change in a load imposed on the transmission system, and a reflected wave that is generated in the transmission system in accordance with that change. Generally, when the characteristic impedance of a power feed line path (usually, a power feed line having a property of 50 ohms or 75 ohms) and the load impedance match, high frequency power can be fed most efficiently relative to the load. In the embodiment shown in FIG. 1, the characteristic impedance of the power feed line path is an impedance for a power feed line that extends from the right end of the modulator 3 to the left end of the matching circuit 5, and the load impedance is the impedance (the total characteristic for the coil antennas 6, 7 and the power requesting circuit of the IC card) for a system on the right side of the matching circuit 5 (called a transmission system). In the condition where all the high frequency power flows to the load along the power feed line, the power is completely absorbed by the load. This is the state where the matching of the load of the transmission system occurs.

In the state where there is an incomplete match, i.e., when the impedances for the load condition and on the power feed line differ from each other, or when the load is not a pure resistance because it includes equivalent inductance and capacitance components (the complex elements do not cancel each other out), part of the high frequency power is not absorbed by the load and is inadvertently fed into the transmission system. The power that is returned from the load side in the transmission system is called a reflected wave, and the magnitude of the reflected wave depends on the degree to which the match is incomplete.

The initial state where the matching of the load of the transmission system occurs is purposely set, and the alternating-current property of the IC card is changed in accordance with data transmitted from the IC card. Accordingly, the load imposed on the transmission system is varied, and a reflected wave according to the load change is generated. That is, since the reflected wave is changed in accordance with the data transmitted from the IC card, the received data can be identified by monitoring the reflected wave.

The matching circuit 5 of the card reader contains a coil L1 and capacitors C1 and C2. One end (node A) of the coil L1 is connected to the reflected wave detector 4, and the other end (node B) is connected to the antenna 6. One end of the capacitor C1 is connected to node A and the other end is grounded. One end of the capacitor C2 is connected to node B and the other end is grounded.

The matching circuit 5 employs the coil and the capacitors to compensate for a load impedance when the alternating-current signal generated by the oscillator 1 is supplied, so that the load impedance matches a desirable impedance having a pure resistance. That is, the matching circuit 5 acquires a match for the load on the transmission system. The load is set so that power can be efficiently fed to the load, and any reflected wave exceeding a threshold value will not be generated in the transmission system.

The matching circuit 5 in FIG. 1 has a π type structure wherein the capacitors C1 and C2 are connected to either end of the coil L1. The matching circuit 5, however, may have an L type structure wherein only one capacitor is connected to the coil. The matching circuit 5 should be designed while taking the property on the load side into account.

Data to be transmitted to the card reader, e.g., data stored in the memory 11, is read by the controller 9, and is serialized as transmission data by the serializer 13 to obtain a switching signal having a pulse sequence. In accordance with the order of the pulse sequence, the switching signal is transmitted to the FET, whereat the switching is performed. The coil antenna 7 is sequentially opened and short-circuited, and accordingly, the alternating-current property of the IC card is changed. As a result, the matching of the load on the transmission system, which includes the IC card, changes in accordance with the contents of the transmitted data.

The reflected wave detector 4 provided for the card reader employs the change in the load of the transmission system to detect a reflected wave generated in the transmission system. To detect the reflected wave, a directional coupler is employed for detecting the direction of flow of an alternating current. Various elements can be employed for this coupler. In the present embodiment, a trans-coupling device that utilizes toroidal coil L2 is provided. When the matching is incomplete, high frequency reflected power flows away from the load (from the right to the left in FIG. 1), and elements corresponding to the reflected wave appear at the cathode of diode D1. The high frequency elements of a carrier are removed by a filter 14, which consists of a coil and a capacitor, so that a reflected pulse wave (pulse data) is obtained.

A data specification circuit 15 in the controller 2 compares the pulse data obtained for the reflected wave with a threshold value, and performs data parallelization to identify the received data. FIG. 2 is a diagram showing the relationship between the location of the IC card relative to the card reader and the pulse data. As is shown in FIG. 2(a), when the IC card is positioned at a designated location on the card reader, the reflected pulse wave (data output by the filter 14) is 0V when the received data is a bit corresponding to the OFF state of the switching circuit 10, while the reflected wave is 1 V when the received data is a bit in the other state. However, when the IC card is shifted from its designated location on the card reader, the reflected wave is not 0V (it is about 0.5 V in FIG. 2(b)) even when the received data is a bit corresponding to one state of the switching circuit 10. In this embodiment, however, only the detection of a difference in reflected waves between the ON state and the OFF state of the switching circuit 10 is required for the determination of a bit, and a bit can still be identified by setting an adequate threshold value and by comparing the value of a reflected wave and the threshold value. A fixed value (about 0.75 V in FIG. 2(b)) may be set in advance as the threshold value, or the threshold value may be dynamically determined in accordance with the actual state of the reflected wave.

So long as the coil antennas 6 and 7 are coupled together, a reflected wave for which bit determination can be performed can be detected. Thus, the positional relationship between the card reader and the IC card need not be very strict. Accordingly, for an initially set load imposed on a transmission system, a complete match for which no reflected wave is generated need not be acquired.

In the above embodiment, in the card reader, the received data is identified not by receiving a wave that is emitted by the IC card into the atmosphere, but by detecting the load condition of the transmission system, i.e., an alternating current that is reflected in the transmission. The magnitude of the reflected wave in the transmission system depends on the load placed on the transmission system, and is not affected by the noise field in the vicinity of the antenna. Therefore, a system that is not affected by the peripheral noise field is provided.

As is described above, the method of the present invention is provided for the detection of the load condition of the transmission system, and not for the receipt of a wave emitted by the IC card. As a result, an additional reception antenna is not required for the card reader, and only one antenna is employed in the card reader.

Furthermore, according to this embodiment, a wireless IC card system can also be easily provided that uses a low frequency in an HF band that is actually employed.

While one embodiment of the invention has been described, it will be apparent to those skilled in the art that many variations of that embodiment are possible. Therefore, it should be understood that the invention is not limited to the described embodiment but can be determined by the spirit and scope of the attached claims.

Claimed is:

1. A wireless IC card system having a card reader and an IC card, said IC card employing an antenna for transmitting data to an antenna of said card reader, comprising:

oscillation means, provided for said card reader, for generating an alternating current signal as a carrier;

switching means, connected to said antenna of said IC card; control means, provided for said IC card, for controlling said switching means in accordance with the contents of data to be transmitted to said IC card reader, so that an alternating current property of said IC card is changed, and for selectively changing a load imposed on a transmission system between said IC card and said card reader to a first state or to a second state;

reflected wave detection means, provided for said card reader, for detecting a reflected wave that occurs in said transmission system in accordance with said load; and data identification means, provided for said card reader, for employing a detected reflected wave to identify said data to be transmitted.

2. The wireless IC card system according to claim 1, wherein said antenna is a coil antenna.

3. The wireless IC card system according to claim 1 or 2, further comprising matching means, provided for said card reader and having a coil and a capacitor, for initially setting said first state where matching said load of said transmission system is acquired when said alternating-current signal is supplied.

4. The wireless IC card system according to claim 3, wherein said matching means is located between said reflective wave detection means and said antenna on said card reader side.

5. The wireless IC card system according to claim 1 or 2, wherein said reflected wave detection means includes directional coupling means for detecting an alternating current direction in said transmission system.

6. The wireless IC card system according to claim 5, wherein said reflected wave detection means further includes a filter having a coil and a capacitor for eliminating high frequency elements of a carrier, and said data identification means receives the output from said filter.

7. The wireless IC card system according to claim 6, wherein, when the output from said filter is greater than a threshold value, said data identification means determines that said transmitted data is data in one state, and when the output from said filter is smaller than a threshold value, said data identification means determines that said transmitted data is data in the other state.

8. An IC card reader, receiving data from an IC card through an antenna, comprising:

oscillation means for generating an alternating current signal as a carrier;

reflected wave detection means for changing an alternating current property of said IC card in accordance with the contents of data received from said IC card, and for selectively changing a load imposed on a transmission system between said IC card and said card reader to a first state or to a second state in order to detect a reflected wave occurring in said transmission system; and data identification means for identifying said received data in accordance with said detected reflected wave.

9. The IC card reader according to claim 8, wherein said antenna is a coil antenna.

10. The IC card reader according to claim 8 or 9, further comprising matching means, having a coil and a capacitor, for initially setting said first state where matching said load of said transmission system is acquired when said alternating-current signal is supplied.

11. The IC card reader according to claim 10, wherein said matching means is located between said reflective wave detection means and said antenna.

12. The IC card reader according to claim 8 or 9, wherein said reflected wave detection means includes directional coupling means for detecting an alternating current direction in said transmission system.

13. The IC card reader according to claim 12, wherein said reflected wave detection means includes a filter having a coil and a capacitor for eliminating high frequency elements of a carrier, and said data identification means receives the output from said filter.

14. The IC card reader according to claim 13, wherein, when output from said filter is greater than a threshold value, said data identification means determines that said transmitted data is data in one state, and when output from said filter is smaller than a threshold value, said data identification means determines that said transmitted data is data in the other state.

15. An IC card comprising:

a coil antenna;

switching means, connected to said coil antenna, for selectively opening or short-circuiting said antenna;

a memory in which data to be transmitted are stored; and control means controlling said switching means in accordance with said data stored in said memory for selectively changing an alternating-current property of said IC card so as to change a load condition on a transmission system between a transmitter and a receiver, and for generating a reflected wave according to said transmitted data in said transmission system, so that said receiver of said data can identify said data.

16. An IC card comprising:

a coil antenna;

a switching circuit, connected to said coil antenna, for selectively opening or short-circuiting said antenna;

a memory in which data to be transmitted are stored; and a control circuit controlling said switching circuit in accordance with said data stored in said memory for selectively changing an alternating-current property of said IC card so as to change a load condition on a transmission system between a transmitter and a receiver, and for generating a reflected wave according to said transmitted data in said transmission system, so that said receiver of said data can identify said data.

17. The AC card according to claim 16 in combination with an IC card reader comprising:

an reader antenna;

an oscillator for generating an alternating-current signal as a carrier;

a reflected wave detection circuit for changing an alternating-current property of said IC card in accordance with the contents of data received from said IC card, and for selectively changing to a first state or to a second state a load imposed on a transmission system between said IC card and said card reader in order to detect a reflected wave occurring in said transmission system; and a data identification circuit for identifying said received data in accordance with said detected reflected wave.

18. The IC card reader according to claim 17, wherein said reader antenna is a coil antenna.

19. The IC card reader according to claim 18, further comprising a matching circuit, having a coil and a capacitor, for initially setting said first state where matching said load of said transmission system is acquired when said alternating-current signal is supplied.

20. The IC card reader according to claim 19, wherein said matching circuit is located between said reflective wave detection circuit and said antenna.

21. The IC card reader according to claim 20, wherein said reflected wave detection circuit includes directional coupling means for detecting an alternating current direction in said transmission system.

22. The IC card reader according to claim 21, wherein said reflected wave detection circuit includes a filter having a coil and a capacitor for eliminating high frequency elements of a carrier, and said data identification circuit receives the output from said filter.

23. The IC card reader according to claim 22, wherein said data detection circuit includes as a level detection circuit that determines that when output from said filter is greater than a threshold value, that said transmitted data is data in one state, and when output from said filter is smaller than a threshold value, determines that said transmitted data is data in the other state.

24. A method for communicating between an IC card unit and IC card reader unit comprising:

establishing between the units a transmission system with a characteristic impedance for transmission and reception over antennas in both units of data between the units;

providing a load for the transmission system matching the characteristic impedance;

varying the signals provided to the antenna of one of the units to change the load on the transmission system from the characteristic impedance in accordance with data stored in the said one unit; and detecting in the other unit energy reflected back in the transmission line as a result of the change in characteristic impedance.

25. The method of claim 24 wherein said one unit is said IC card unit and the other unit is said IC card unit reader.

* * * * *